US009116753B2

United States Patent
Devi (10) Patent No.: US 9,116,753 B2
(45) Date of Patent: Aug. 25, 2015

(54) SYSTEM AND METHOD FOR DYNAMIC SCALING BASED ON A REFERENCE ARCHITECTURE

(75) Inventor: Yogesh Devi, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 438 days.

(21) Appl. No.: 13/543,856

(22) Filed: Jul. 8, 2012

(65) Prior Publication Data

US 2014/0013323 A1 Jan. 9, 2014

(51) Int. Cl.
*G06F 9/46* (2006.01)
*G06F 9/455* (2006.01)
*G06F 15/173* (2006.01)
*G06F 9/50* (2006.01)

(52) U.S. Cl.
CPC .......... *G06F 9/5083* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | |
|---|---|---|
| 7,596,654 B1 | 9/2009 | Wong |
| 7,698,429 B1 | 4/2010 | Houlding et al. |
| 7,805,516 B2 | 9/2010 | Kettler et al. |
| 8,108,855 B2 | 1/2012 | Dias et al. |
| 8,171,141 B1 | 5/2012 | Offer et al. |
| 2007/0078988 A1 | 4/2007 | Miloushev et al. |
| 2008/0082983 A1 | 4/2008 | Groetzner et al. |
| 2008/0244600 A1 | 10/2008 | Wong et al. |
| 2009/0222560 A1 | 9/2009 | Gopisetty et al. |
| 2010/0125665 A1 | 5/2010 | Simpson et al. |
| 2011/0125894 A1 | 5/2011 | Anderson et al. |
| 2011/0126197 A1 | 5/2011 | Larsen et al. |
| 2011/0126207 A1 | 5/2011 | Wipfel et al. |
| 2012/0072762 A1 | 3/2012 | Atchison et al. |
| 2012/0304191 A1* | 11/2012 | Morgan ........................ 718/105 |

* cited by examiner

*Primary Examiner* — Meng An
*Assistant Examiner* — Bing Zhao
(74) *Attorney, Agent, or Firm* — Winstead PC (57) ABSTRACT

A method includes, on a virtualization platform, creating a first runtime instance of a virtual appliance. The virtual appliance includes a solution stack of software components selected from a reference architecture. The method further includes, responsive to satisfaction of at least one performance criterion, dynamically scaling-out the solution stack to one or more additional runtime instances of the virtual appliance. The dynamically scaling-out includes distributing a subset of the solution stack to each of the first runtime instance and the one or more additional runtime instances.

20 Claims, 10 Drawing Sheets

SYSTEM AND METHOD FOR DYNAMIC SCALING BASED ON A REFERENCE ARCHITECTURE

BACKGROUND

1. Technical Field

The present invention relates generally to virtual appliances and more particularly, but not by way of limitation, to systems and methods for configuring and scaling runtime instances.

2. History of Related Art

Software is often deployed as virtual appliances at a hypervisor layer of a computer system. As one skilled in the art will appreciate, a virtual appliance is an image file that packages a pre-configured operating-system environment with application software. The application software of a virtual appliance generally includes one or more software components that constitute a solution stack. A solution stack, as used herein, is a set of software components that deliver a product or service. A software component, as used herein, is a software package, a web service, or module that encapsulates a set of related functions or data. An instance of a virtual appliance executing on a given hypervisor is referred to herein as a runtime instance.

Because necessary software components are already installed, virtual appliances generally eliminate the necessity for installation and configuration. Virtual appliances thereby simplify delivery of application software. However, problems arise when an increase in demand from a runtime instance mandates more physical resources (e.g., processing power and memory) than has been provisioned to that runtime instance. A typical solution is to provision another runtime instance with additional resources typically on another physical computer. This usually involves replicating the virtual appliance for that runtime instance on the physical computer. The result, however, is a new runtime instance with an identical solution stack that is disjoint from the solution stack of the original runtime instance. Therefore, the new runtime instance and the original runtime instance may not function as a single interoperating stack.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on a virtualization platform, creating a first runtime instance of a virtual appliance. The virtual appliance includes a solution stack of software components selected from a reference architecture. The method further includes, responsive to satisfaction of at least one performance criterion, dynamically scaling-out the solution stack to one or more additional runtime instances of the virtual appliance. The dynamically scaling-out includes distributing a subset of the solution stack to each of the first runtime instance and the one or more additional runtime instances.

In one embodiment, an information handling system includes a computer system including physical resources and a hypervisor resident on the computer system. The hypervisor is operable to create a first runtime instance of a virtual appliance. The virtual appliance includes a solution stack of software components selected from a reference architecture. The hypervisor is further operable, responsive to satisfaction of at least one performance criterion, to dynamically scale out the solution stack to one or more additional runtime instances of the virtual appliance. The dynamic scale-out comprises distribution of a subset of the solution stack to each of the first runtime instance and the one or more additional runtime instances.

In one embodiment, a computer-program product includes a computer-usable medium having computer-readable program code embodied therein. The computer-readable program code is adapted to be executed to implement a method. The method includes creating a first runtime instance of a virtual appliance. The virtual appliance includes a solution stack of software components selected from a reference architecture. The method further includes, responsive to satisfaction of at least one performance criterion, dynamically scaling-out the solution stack to one or more additional runtime instances of the virtual appliance. The dynamically scaling-out includes distributing a subset of the solution stack to each of the first runtime instance and the one or more additional runtime instances.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, demand-based scaling of runtime instances can be facilitated via utilization of a reference architecture. As used herein, a reference architecture is a blueprint that defines a solution stack of software components and interactions between those software components. In a typical embodiment, the reference architecture can be leveraged to create a virtual appliance that includes a selected subset of components from the reference architecture. In a typical embodiment, a runtime instance of the virtual appliance can be dynamically scaled out to multiple virtual appliances based on demand and dynamically scaled in as demand curtails.

Figure 1A:
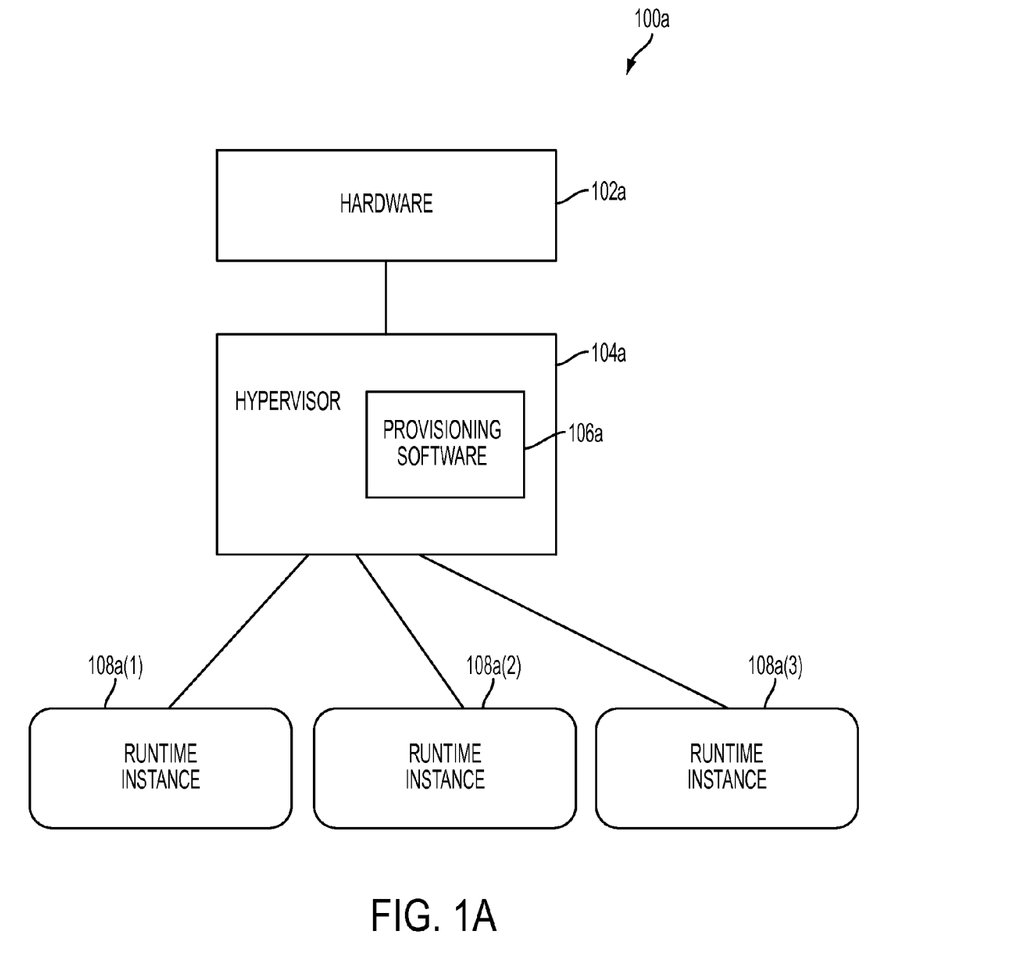
FIG. 1A illustrates a virtualization framework.

FIG. 1A describes a virtualization framework 100a that may be implemented according to a typical embodiment. The virtualization framework 100a includes a hardware layer 102a, a hypervisor layer 104a, a runtime instance 108a(1), a runtime instance 108a(2), and a runtime instance 108a(3). For convenient reference, the runtime instance 108a(1), the runtime instance 108a(2), and the runtime instance 108a(3) may be collectively referenced as a plurality of runtime instances 108a.

The hardware layer 102a includes underlying physical hardware that enables the virtualization framework 100a. For example, the hardware layer 102a can include an infrastructure service cloud or any number of physical server computers. As shown, hypervisors at the hypervisor layer 104a run directly on the underlying physical hardware at the hardware layer 102a. The hypervisor layer 104a logically abstracts the hardware layer 102a from the plurality of runtime instances 108a.

Provisioning software 106a at the hypervisor layer 104a manages the allocation of physical resources of the hardware layer 102a to the plurality of runtime instances 108a. In various embodiments, the provisioning software 106a is commercial provisioning software offered by a third-party vendor. Each of the plurality of runtime instances 108a is an instance of a virtual appliance that implements all or part of a solution stack for a reference architecture. For example, in various embodiments, the reference architecture is a service-oriented architecture (SOA).

Figure 1B:
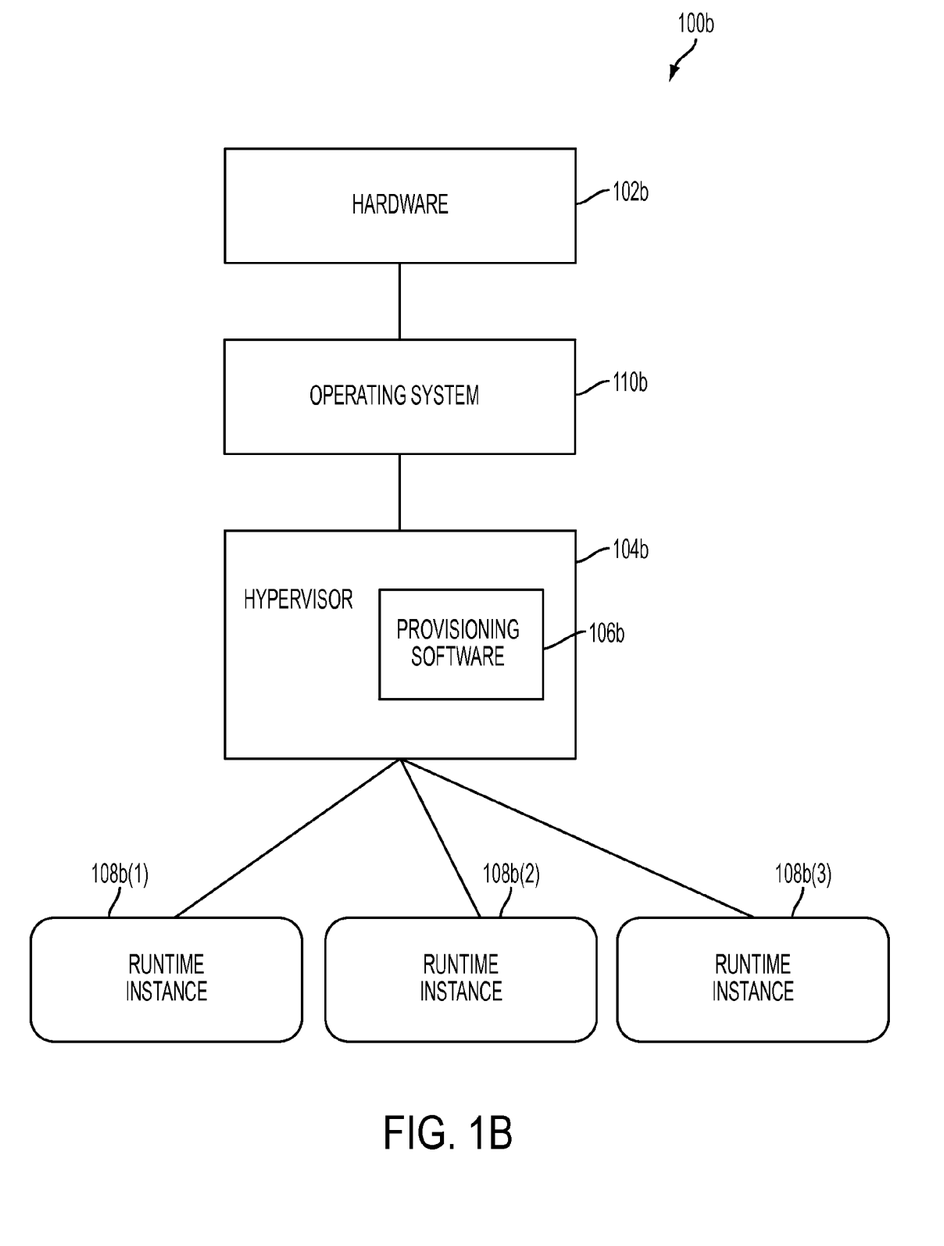
FIG. 1B illustrates a virtualization framework.

FIG. 1B describes a virtualization framework 100b that may be implemented according to a typical embodiment. In similar fashion to the virtualization framework 100a of FIG. 1A, the virtualization framework 100b includes a hardware layer 102b, a hypervisor layer 104b, a runtime instance 108b(1), a runtime instance 108b(2), and a runtime instance 108b(3). For convenient reference, the runtime instance 108b(1), the runtime instance 108b(2), and the runtime instance 108b(3) may be collectively referenced as a plurality of runtime instances 108b.

The virtualization framework 100b differs from the virtualization framework 100a of FIG. 1A in that an operating system 110b is disposed between the hardware layer 102b and the plurality of runtime instances 108b. Hypervisors at the hypervisor layer 104b thus run on the operating system 110b rather directly on hardware as described with respect to the virtualization framework 100a of FIG. 1A. The hardware layer 102b, the hypervisor layer 104b, and the plurality of runtime instances 108b are otherwise identical to the hardware layer 102a, the hypervisor layer 104a, and the plurality of runtime instances 108a, respectively, as described with respect to FIG. 1A.

Figure 2:
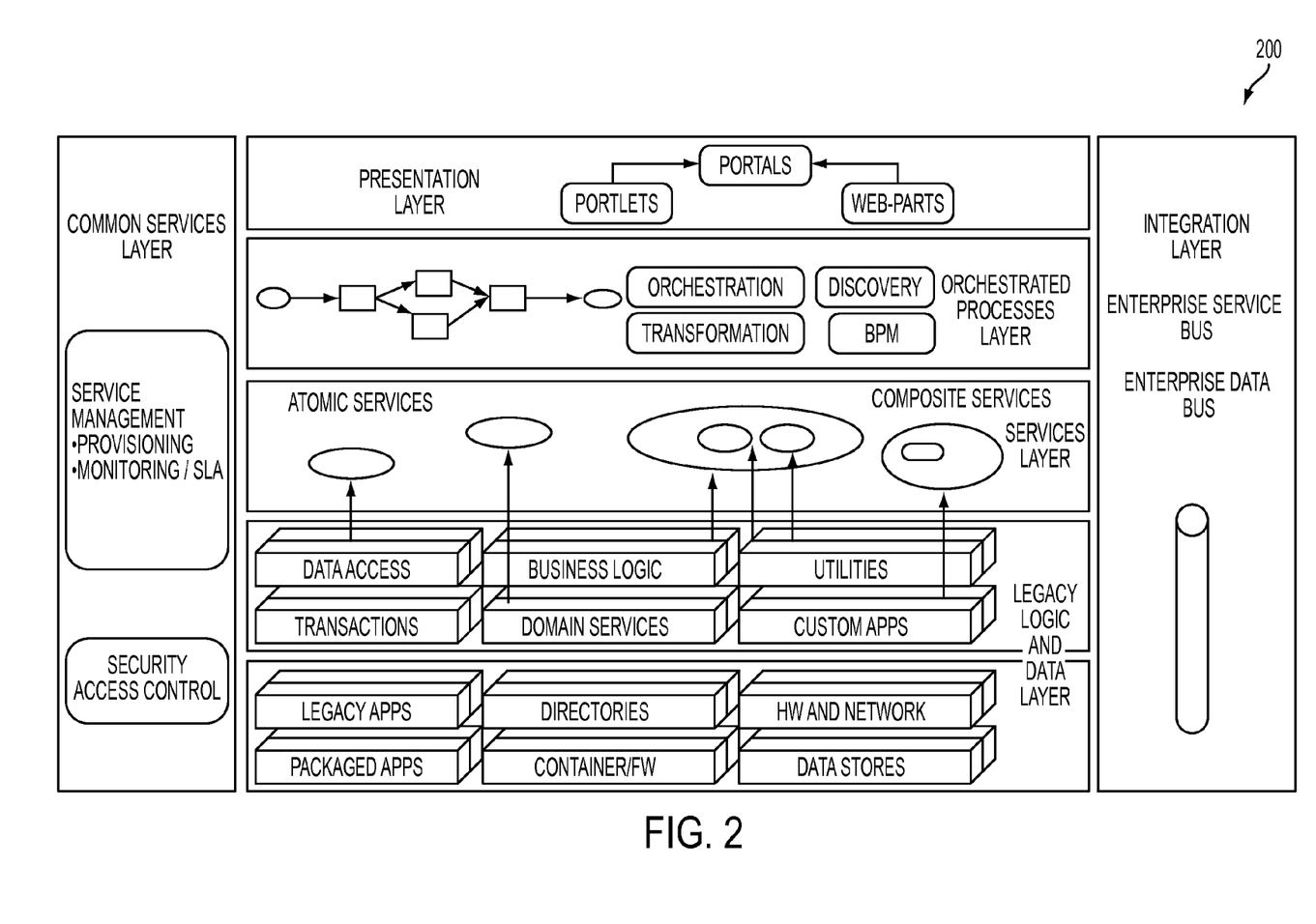
FIG. 2 illustrates a reference architecture.

FIG. 2 illustrates a reference architecture 200 that is a blueprint for a SOA. Accordingly, the reference architecture 200 provides a service infrastructure that specifies a collection of software components that might be part of a solution stack for any given enterprise as well as interactions between those software components. It should appreciated that the reference architecture 200 can be modified at any time to include additional, fewer, or different software components. It should also be appreciated that, in a typical embodiment, the reference architecture 200 incorporates software components from heterogeneous sources and, as such, is an open and standards-based architecture.

Figure 3:
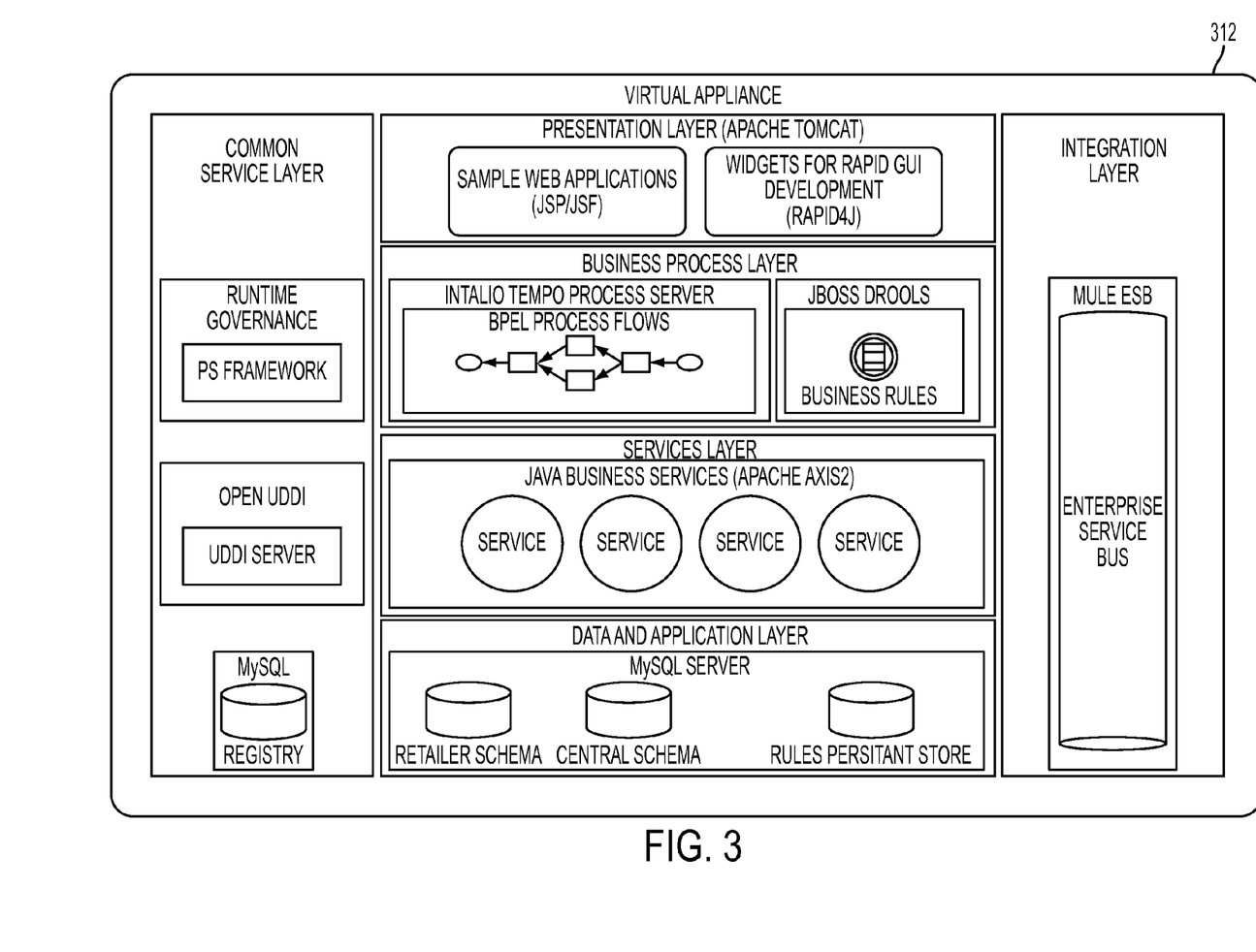
FIG. 3 illustrates a virtual appliance.

FIG. 3 illustrates a virtual appliance 312 that embodies a reference architecture such as, for example, the reference architecture 200 of FIG. 2. The virtual appliance 312 is an image file that includes a pre-configured operating-system environment (e.g., for UNIX) packaged with software components of the reference architecture.

Figure 4:
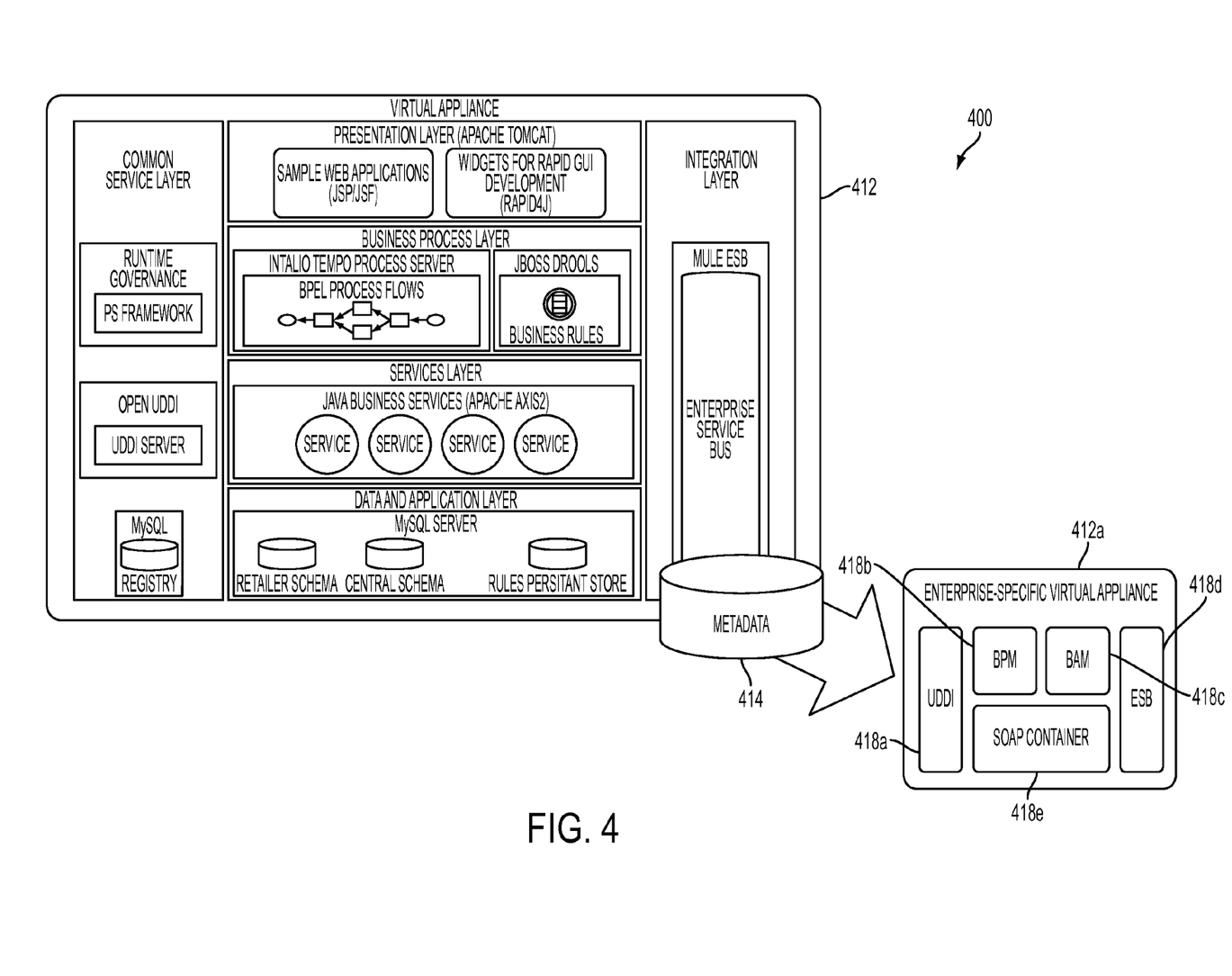
FIG. 4 illustrates an initial-provisioning process.

FIG. 4 illustrates an initial-provisioning process 400. In particular, FIG. 4 illustrates a virtual appliance 412 that implements a reference architecture such as, for example, the reference architecture 200 of FIG. 2. In a typical embodiment, the virtual appliance 412 is similar to the virtual appliance 312 of FIG. 3 and has embedded thereon a metadata store 414. The metadata store 414 includes configuration metadata (e.g., XML) that specifies software components of the reference architecture, interactions between the software components, and interdependencies between the software components.

In a typical embodiment, the configuration metadata enables selection of software components for generation of an enterprise-specific virtual appliance 412a. In a typical embodiment, the selection of software components is accomplished via metadata manipulation. Metadata manipulation typically encompasses editing the configuration metadata so that only selected software components are active when the enterprise-specific virtual appliance 412a is instantiated. In that way, software components of the reference architecture that are not selected are inactivated in the enterprise-specific virtual appliance 412a. In various embodiments, as an alternative to metadata manipulation, a configurator application enables the software components to be graphically selected.

As shown in FIG. 4, the selected components include a selected component 418a, a selected component 418b, a selected component 418c, a selected component 418d, and a selected component 418e (referenced collectively herein as selected components 418). The selected components 418 collectively constitute an enterprise-specific solution stack.

Figure 5:
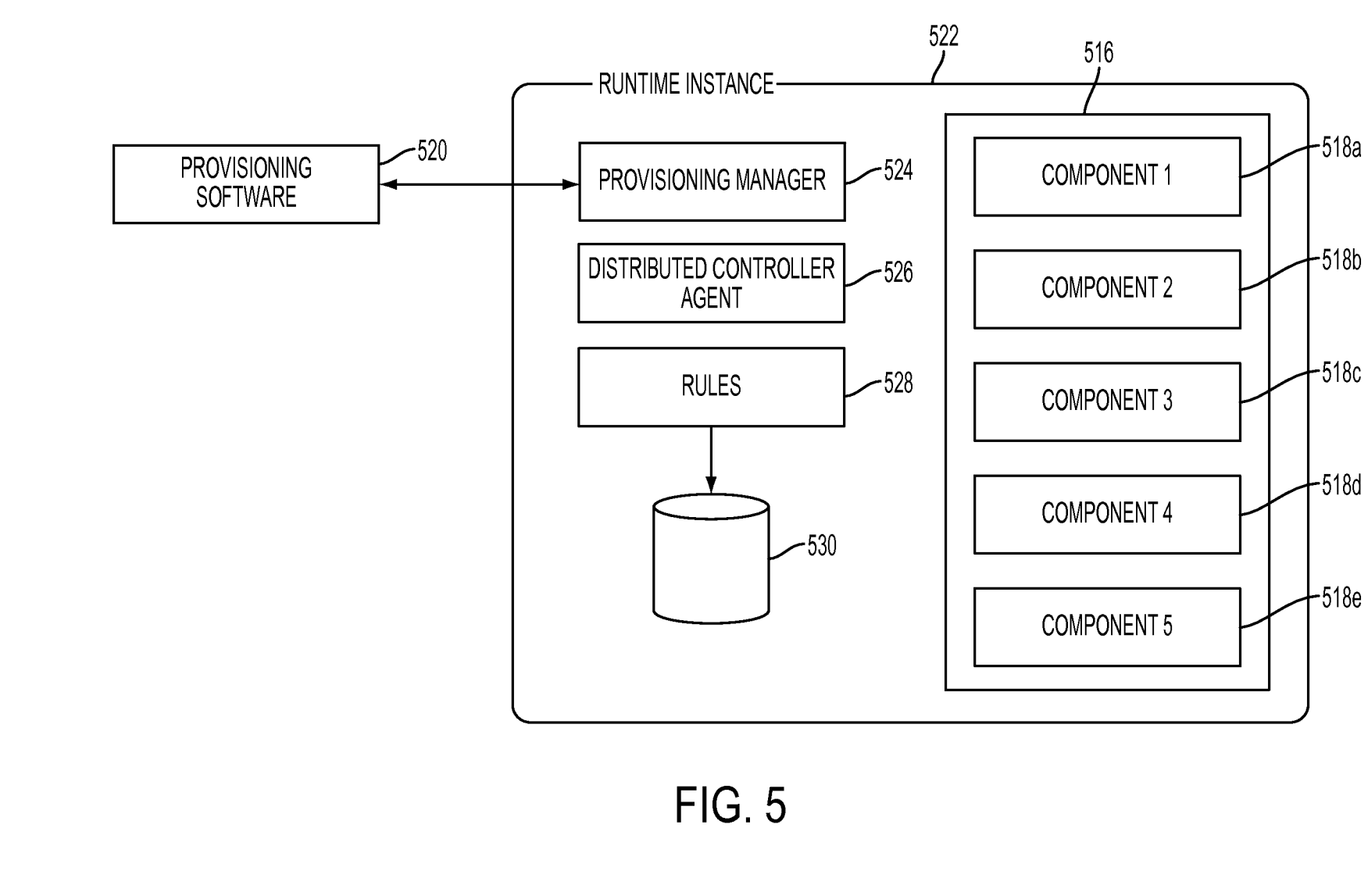
FIG. 5 illustrates a runtime instance.

FIG. 5 illustrates a runtime instance 522 of an enterprise-specific virtual appliance such as, for example, the enterprise-specific virtual appliance 412a of FIG. 4. The runtime instance 522 includes a provisioning manager 524, a distributed controller agent (DCA) 526, a metadata store 530, and an enterprise-specific solution stack 516. The runtime instance 522 communicates with provisioning software 520 via the provisioning manager 524.

In a typical embodiment, the provisioning manager 524 helps decouple the runtime instance 522 from the provisioning software 520. The provisioning manager 524 typically operates as a single point of access to the provisioning software 520 and thereby abstracts the provisioning software 520 from the rest of the runtime instance 522. Thus, if the provisioning software 520 is modified or replaced by new provisioning software, it is typically only necessary to modify the provisioning manager 524 to interact with the modified or new provisioning software. Relationships and interactions within the runtime instance 522 are typically not affected.

In a typical embodiment, the provisioning software 520 is similar to the provisioning software 106a and 106b described with respect to FIGS. 1A and 1B, respectively. Externally to the runtime instance 522, the provisioning software 520 manages and provisions physical resources of a hardware layer such as, for example, processing power and memory, to the runtime instance 522. As described in greater detail with respect to FIGS. 6 and 7, the provisioning manager 524 also interacts with the provisioning software 520 to spawn or consolidate runtime instances when dynamic scaling is performed.

The enterprise-specific solution stack 516 includes software components 518a, 518b, 518c, 518d, and 518e (referred to collectively herein as a plurality of solution components 518). The plurality of solution components 518 are software components that have been selected for an enterprise via a reference architecture as described with respect to FIG. 4. It should be appreciated that the enterprise-specific solution stack 516 can include any number of heterogeneous software components such as, for example, software components of a SOA.

In a typical embodiment, the metadata store 530 includes scaling rules 528 and can further include configuration metadata as described above with respect to the metadata store 414 of FIG. 4. The scaling rules 528 include metadata-defined rules (e.g., XML) that specify whether and how the runtime instance 522 should scale based on utilization/performance metrics. The utilization/performance metrics measure utilization of the physical resources that have been provisioned by the provisioning software 520. The utilization/performance metrics can include processor utilization, memory utilization, and other like factors that measurably impact performance or direct performance measures such as throughput of one of the plurality of solution components 518.

For purposes of determining whether to dynamically scale, the scaling rules 528 specify performance criteria that, when satisfied by the utilization/performance metrics, cause dynamic scaling to occur. In a typical embodiment, dynamic scaling can occur either by scaling-in or scaling-out. Scaling-out refers to a process for redistributing a solution stack such as, for example, the enterprise-specific solution stack 516, among a plurality of additional runtime instances so that, in total, more physical resources are provisioned to the solution stack. Scaling-in refers to a process for redistributing an enterprise-specific solution stack such as, for example, the enterprise-specific solution stack 516, among fewer runtime instances so that, in total, fewer physical resources are provisioned to the solution stack.

For purposes of specifying how scaling should occur, the scaling rules 528 define a plurality of explosion levels for the solution stack 516. As used herein, explosion levels are discrete levels of progressively increasing throughput that are defined in terms of runtime instances. In a typical embodiment, the plurality of explosion levels are enumerated from one to n such that one represents a lowest level of throughput and n represents a highest level of throughput. There is generally no logical limit to a number of explosion levels that can be defined.

For each explosion level in the plurality of explosion levels, the scaling rules 528 specify: (1) a total number of runtime instances; (2) a subset of the plurality of solution components 518 that should be distributed to each runtime instance; and (3) provisioning requirements for each runtime instance. The provisioning requirements specify physical resources such as, for example, a number of central processing units (CPUs) and an amount of volatile or non-volatile memory, that should be provisioned to a given runtime instance. In a typical embodiment, the scaling rules 528 predefine the plurality of explosion levels via metadata manipulation.

The scaling rules 528 are typically pre-established based on criteria that includes clubbing preferences, resource needs, and multi-instance capabilities. Clubbing preferences consider interconnections and interdependencies among the plurality of solution components 518. By way of example, if the software component 518a and the software component 518b are considered highly coupled as determined by a high level of interdependence, the clubbing preferences could require that the software component 518a and the software component 518b be distributed to a same runtime instance.

Resource needs consider physical resources required by each of the plurality of solution components 518. The resource needs may indicate, for example, that certain ones of the plurality of solution components 518 have more intensive resource needs than others. In such cases, the resource needs can be used to effect an equitable redistribution of the plurality of solution components 518. The multi-instance capabilities relate to an ability of each of the plurality of solution components 518 to be split among multiple runtime instances. For example, if the component 518e is a cluster-aware database or is a software component that has federation capabilities, the component 518e can realize performance improvements by being distributed to more than one runtime instance during dynamic scaling.

The DCA 526 controls the runtime instance 522 and is responsible for monitoring the utilization/performance metrics and applying the scaling rules 528. Changes in explosion levels are triggered via, for example, satisfaction of the performance criteria described above. Therefore, scaling-out generally involves advancing to a higher explosion level and scaling-in generally involves returning to a lower explosion level. One of ordinary skill in the art will appreciate that scaling-in generally only occurs when a current explosion level is beyond explosion-level one.

When the DCA 526 deems scaling-in or scaling-out to be necessary based on the scaling rules 528, the DCA 526 communicates a new explosion level to the provisioning manager 528. Thereafter, the provisioning manager 524 interfaces with the provisioning software 520 to enact the new explosion level. As described in greater detail with respect to FIGS. 6A and 6B, the transition to the new explosion level typically necessitates activating and/or deactivating appropriate ones of the plurality of solution components 518 in the runtime instance 522. In some embodiments, it is preferable to achieve the new explosion level manually by causing an alert to be presented, for example, to a data-center operator who performs ministerial tasks of authorizing and implementing the new explosion level. In other embodiments, the new explosion level is achieved automatically via greater cohesion and integration between the provisioning manager 524 and the provisioning software 520. In these embodiments, the ministerial tasks are accomplished automatically without a need for intervention by the data-center operator.

Figure 6A:
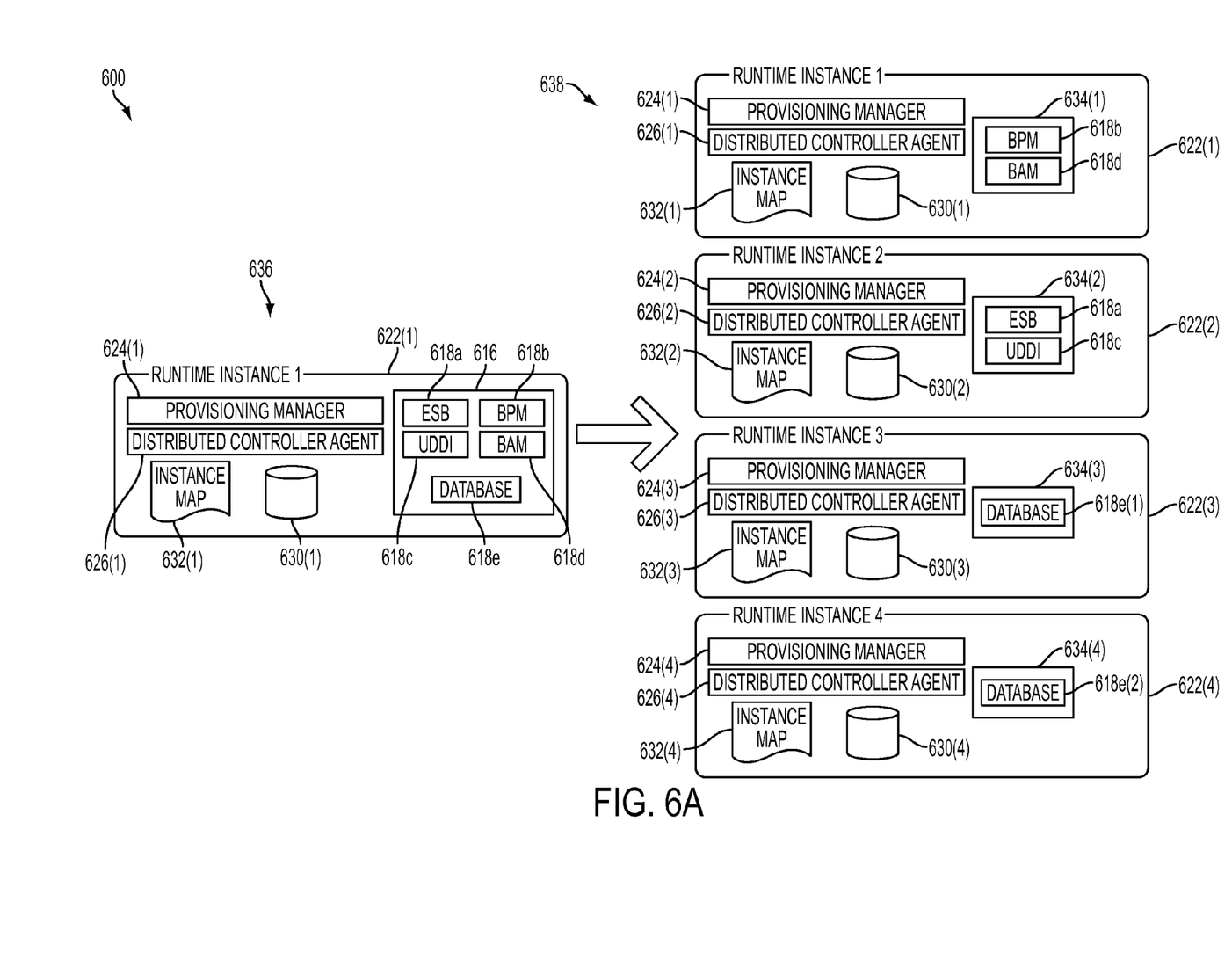
FIG. 6A illustrates a scaling-out process.

FIG. 6A describes a scaling-out process 600 for transitioning from an explosion-level one 636 to an explosion-level two 638. The scaling-out process 600 begins at the explosion-level one 636. The explosion-level one 636 includes a runtime instance 622(1), which instance is tagged by the provisioning software as runtime-instance one.

The runtime instance 622(1) includes a provisioning manager 624(1), a DCA 626(1), a metadata store 630(1), and an instance map 632(1). The runtime instance 622(1) further includes a solution stack 616(1) that includes software components 618a, 618b, 618c, 618d, and 618e (collectively, a plurality of solution components 618). In a typical embodiment, the provisioning manager 624(1), the DCA 626(1), the metadata store 630(1), and the solution stack 616(1) operate as described above with respect to the provisioning manager 524, the DCA 526, the metadata store 530, and the enterprise-specific solution stack 516, respectively, of FIG. 5.

The instance map 632(1) includes metadata (e.g., XML) describing a current explosion level. Using tags assigned by the provisioning software to each runtime instance, the instance map 632(1) maps each of the plurality of solution components 618 to a runtime instance. The instance map 632(1) further maps each tag to a domain name associated with the tagged runtime instance. For example, at the explosion-level one 636, the instance map 632(1) includes metadata indicating that the current explosion level is the explosion-level one 636 and that all of the plurality of solution components 618 are mapped to the runtime instance 622(1). In a typical embodiment, the provisioning manager 624(1) creates and maintains the instance map 632(1) based on the scaling rules in the metadata store 630(1).

In a similar manner to that described with respect to FIG. 5, the scaling rules of the metadata store 630(1) specify, for each explosion level, a total number of runtime instances over which the solution stack 616 is distributed. For purposes of this example, the scaling rules of the metadata store 630(1) specify that, at the explosion-level two 638, the solution stack 616 should be distributed among four runtime instances. The scaling rules of the metadata store 630(1) further specify provisioning requirements and identify which of the plurality of solution components 618 should be distributed to each runtime instance.

In operation, the DCA 626(1) calls the provisioning manager 624(1) when performance criteria specified by the scaling rules is satisfied. In response, the provisioning manager 624(1) interacts with the provisioning software to transition to the explosion-level two 638 as defined by the scaling rules. Accordingly, the provisioning software creates three additional runtime instances, i.e., a runtime instance 622(2), a runtime instance 622(3), and a runtime instance 622(4), and provisions the provisioning requirements specified by the scaling rules. The provisioning software also tags the runtime instances 622(2), 622(3), and 622(4) as runtime-instance two, runtime-instance three, and runtime-instance four, respectively (the runtime instance 622(1) was tagged as runtime-instance one at the explosion-level one 636).

Because the runtime instances 622(2), 622(3), and 622(4) are instances of a same virtual appliance as the runtime instance 622(1), the runtime instances 622(2), 622(3), and 622(4) are considered replicas of the runtime instance 622(1). The runtime instances 622(2), 622(3), and 622(4) include a provisioning manager 624(2), 624(3), and 624(4), respectively, a DCA 626(2), 626(3), and 626(4), respectively, a metadata store 630(2), 630(3), and 630(4), respectively, and an instance map 632(2), 632(3), and 632(4), respectively. In a typical embodiment, the provisioning managers 624(2), 624(3), and 624(4), the DCAs 626(2), 626(3), and 626(4), the metadata stores 630(2), 630(3), and 630(4), and the instance maps 632(2), 632(3), and 632(4) operate similarly to the provisioning manager 624(1), the DCA 626(1), the metadata store 630(1), and the instance map 632(1), respectively, of the runtime instance 622(1).

At the explosion-level two 638, the runtime instances 622(1), 622(2), 622(3), and 622(4) together form the four runtime instances specified by the scaling rules. Based on the scaling rules, a solution-stack subset 634(1), a solution-stack subset 634(2), a solution-stack subset 634(3), and a solution-stack subset 634(4) are distributed to the runtime instances 622(1), 622(2), 622(3), and 622(4), respectively. The solution-stack subset 634(1) includes the software component 618b and the software component 618d, The solution-stack subset 634(2) includes the software component 618a and the software component 618c. The solution-stack subset 634(3) includes a software component 618e(1), which component is a first instance of the software component 618e. Similarly, the solution-stack subset 634(4) includes a software component 618e(2), which component is a second instance of the software component 618e. As indicated in FIG. 6A, the software component 618e is a database component that, in a typical embodiment, is cluster-aware. As a result, the software component 618e is apt to benefit from being distributed on multiple runtime instances by way of the software component 618e(1) and the software component 618e(2).

With particular reference to the runtime instance 622(1), the provisioning manager 624(1) updates the instance map 632(1) responsive to the transition to the explosion-level two 638. In this manner, the instance map 632(1) is updated to reflect that the current explosion level is the explosion-level two 638 and that the solution-stack subset 634(1), the solution-stack subset 634(2), the solution-stack subset 634(3), and the solution-stack subset 634(4) are distributed to the runtime instances 622(1), 622(2), 622(3), and 622(4), respectively. Thereafter, the DCA 626(1) references the instance map 632(1) and deactivates any active software components not contained within the solution-stack subset 634(1) (i.e., the software components 618a, 618c, and 618e). In this fashion, the software component 618b and the software component 618d share physical resources that, at the explosion-level one 636, were shared by all of the solution stack 616.

The runtime instances 622(2), 622(3), and 622(4) operate similarly to the runtime instance 622(1). The provisioning managers 624(2), 624(3), and 624(4) maintain and update the instance maps 632(2), 632(3), and 632(4) based on the explosion-level two 638 as described above with respect to the instance map 632(1). Therefore, upon instantiation at the explosion-level two 638, the DCAs 626(2), 626(3), and 626(4) reference the instance maps 632(2), 632(3), and 632(4), respectively, and only activate those software components in the solution-stack subsets 634(2), 634(3), and 634(4), respectively. Other software components from the solution stack 616 remain present but are deactivated.

It should be appreciated that the solution-stack subsets 634(1), 634(2), 634(3), and 634(4) collectively constitute the solution stack 616. In a typical embodiment, the instance maps 632(1), 632(2), 632(3), and 634(4) enable the solution-stack subsets 634(1), 634(2), 634(3), and 634(4) to function cohesively as a single stack even though distributed across the runtime instances 622(1), 622(2), 622(3), and 624(4), respectively. In a typical embodiment, the runtime instances 622(1), 622(2), 622(3), and 622(4) employ domain-name translation to facilitate communication therebetween. Therefore, the instance maps 632(1), 632(2), 632(3), and 632(4) map the tags assigned to the runtime instances 622(1), 622(2), 622(3), and 622(4) to domain names associated with those runtime instances. In various other embodiments, communication among the runtime instances 622(1), 622(2), 622(3), and 622(4) can be further facilitated via proxies. Proxies will be described with respect to FIG. 7.

Figure 6B:
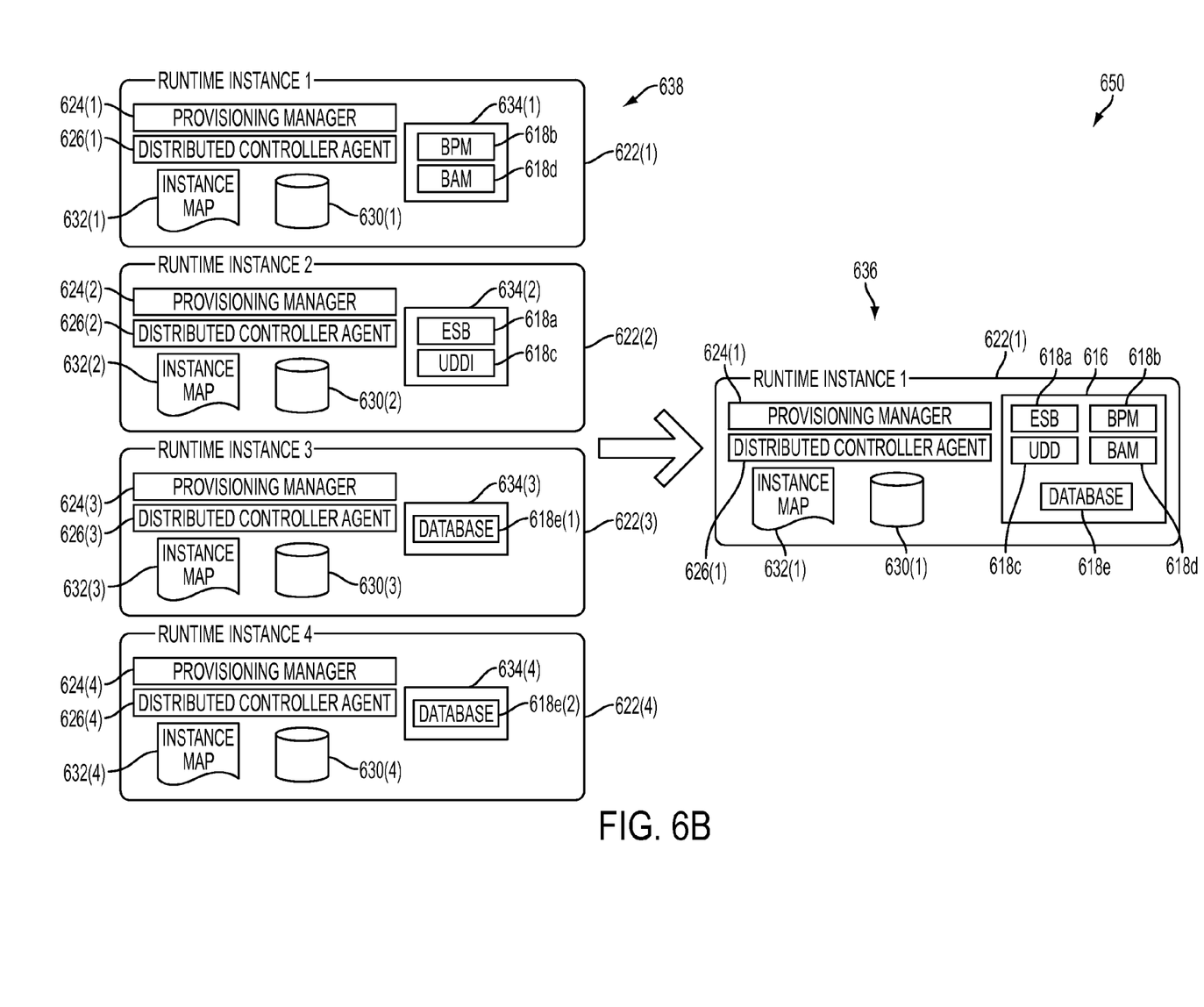
FIG. 6B illustrates a scaling-in process.

FIG. 6B describes a scaling-in process 650 from the explosion-level two 638 back to the explosion-level one 636. The scaling-in process 650 operates in reverse fashion to the scaling-out process 600. The scaling-in process 650 can be triggered in various fashions. In various embodiments, the DCAs 626(1), 626(2), 626(3), and 626(4) can collaborate to determine when performance criteria for scaling-in is satisfied. In various other embodiments, the provisioning software can initiate the scaling-in process 650. Once the scaling-in process 650 is initiated, the provisioning software brings down the runtime instances 624(2), 624(3), and 624(4) in accordance with a transition to the explosion-level one 636.

With particular reference to the runtime instance 622(1), the provisioning manager 624(1) is notified by the provisioning software of the transition back to the explosion-level one 636. In response, the provisioning manager 624(1) updates the instance map 632(1) to reflect that the current explosion level is the explosion-level one 636 and that all of the plurality of solution components 618 are mapped to the runtime instance 622(1). Thereafter, the DCA 626(1) references the instance map 632(1) and activates any inactive components in the solution stack 616 (i.e. the solution components 618a, 618c, and 618e). In this manner, the runtime instance 622(1) survives the scaling-in process 650 and operates as before the scaling-out process 600.

Although FIGS. 6A and 6B illustrate only two explosion levels, it should be appreciated that, in various embodiments, any number of explosion levels may be specified and implemented. Regardless of a number of explosion levels, scaling-in and scaling-out can be implemented as described above with respect to the scaling-in process 600 and the scaling-out process 650, respectively.

Figure 7:
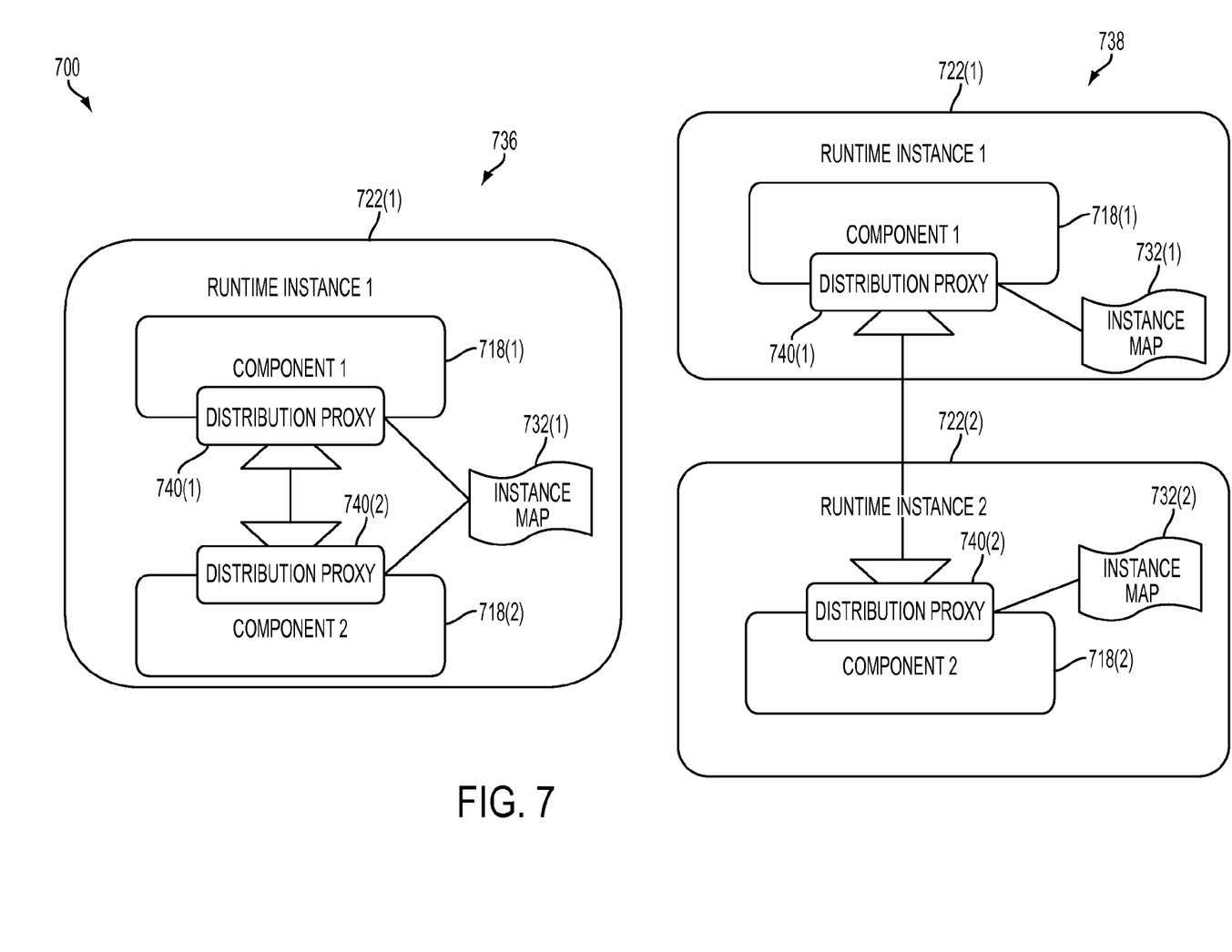
FIG. 7 illustrates an exemplary process for communicating via proxies.

FIG. 7 illustrates an exemplary process 700 for communicating via proxies. At an explosion-level one 736, a runtime instance 722(1) includes a software component 718(1), a software component 718(2), and an instance map 732(1). The software component 718(1) and the software component 718(2) are associated with a distribution proxy 740(1) and a distribution proxy 740(2), respectively.

In a typical embodiment, the instance map 732(1) contains information similar to that of the instance maps 632(1), 632(2), 632(3), and 632(4) as described with respect to FIGS. 6A and 6B and is also updated in a similar fashion responsive to changes in explosion level. The instance map 732(1) tracks a current explosion level and maps runtime instances to domain names. The distribution proxy 740(1) and the distribution proxy 740(2), however, serve to abstract domain names and other communication details. Rather than access the instance map 732(1) directly for purposes of resolving domain names, the software component 718(1) and the software component 718(2) interface with the distribution proxy 740(1) and the distribution proxy 740(2), respectively. The distribution proxy 740(1) and the distribution proxy 740(2) access the instance map 732(1) and handle domain-name translation transparently to the software component 718(1) and the software component 718(2).

At explosion-level two 738, the software component 718(1) is distributed to the runtime instance 722(1) and the software component 718(2) is distributed to a runtime instance 722(2). Although the software component 718(1) and the software component 718(2) are no longer both active on the runtime instance 722(1) and are now associated with different domain names, the software component 718(1) and the software component 718(2) communicate with the distribution proxy 740(1) and the distribution proxy 740(2), respectively, in the same way as at the explosion-level one 736. When communication between the software component 718(1) and the software component 718(2) is necessary at the explosion-level two 738, the distribution proxy 740(1) and the distribution proxy 740(2) access the instance maps 732(1) and 732(2), and coordinate domain-name resolution.

Figure 8:
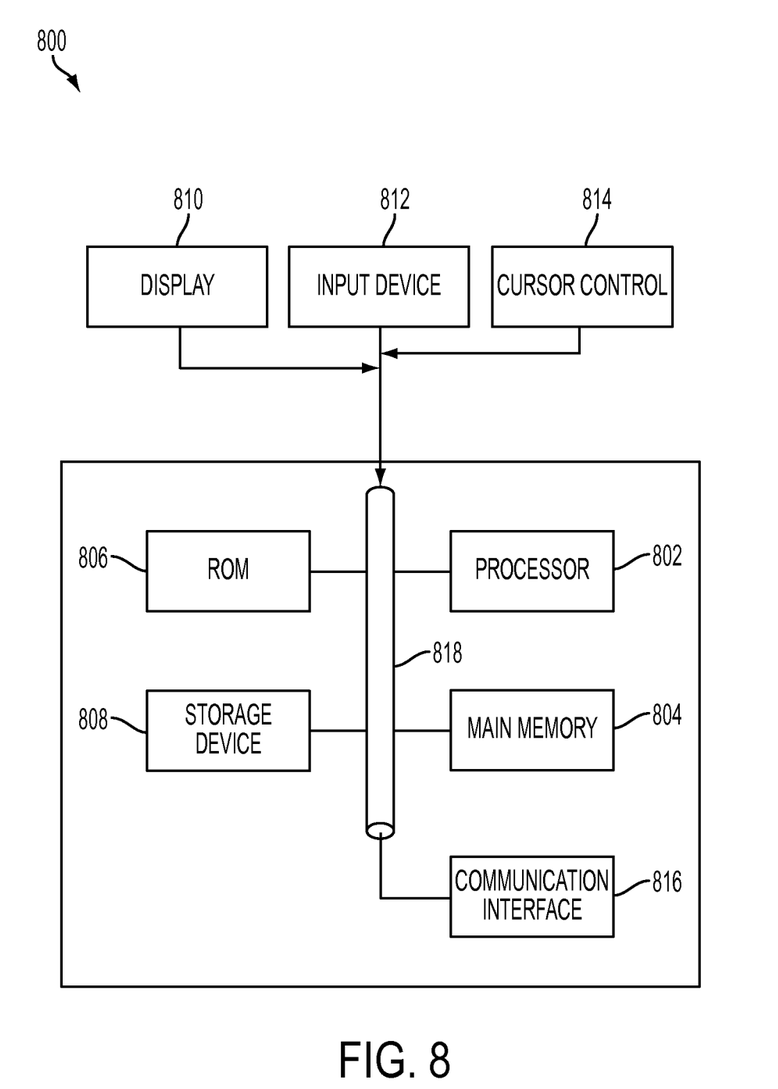
FIG. 8 illustrates an embodiment of a computer system.

FIG. 8 illustrates an embodiment of a computer system 800 on which various embodiments of the invention may be implemented such as, for example, the virtualization framework 100a of FIG. 1A or the virtualization framework 100b of FIG. 1B. The computer system 800 may, for example, constitute all or part of the hardware layer 102a of FIG. 1A or the hardware layer 102b of FIG. 1B. In various embodiments, the computer system 800 may constitute a portion of an infrastructure service cloud. The computer system 800 is typically a physical system or a combination of physical systems that provides physical resources to a hypervisor layer such as, for example, the hypervisor layer 104a of FIG. 1A or the hypervisor layer 104b of FIG. 1B. In the implementation, a computer system 800 may include a bus 818 or other communication mechanism for communicating information and a processor 802 coupled to the bus 818 for processing information. The computer system 800 also includes a main memory 804, such as random-access memory (RAM) or other dynamic storage device, coupled to the bus 818 for storing computer readable instructions by the processor 802.

The main memory 804 also may be used for storing temporary variables or other intermediate information during execution of the instructions to be executed by the processor 802. The computer system 800 further includes a read-only memory (ROM) 806 or other static storage device coupled to the bus 818 for storing static information and instructions for the processor 802. A computer-readable storage device 808, such as a magnetic disk or optical disk, is coupled to the bus 818 for storing information and instructions for the processor 802. The computer system 800 may be coupled via the bus 818 to a display 810, such as a liquid crystal display (LCD) or a cathode ray tube (CRT), for displaying information to a user. An input device 812, including, for example, alphanumeric and other keys, is coupled to the bus 818 for communicating information and command selections to the processor 802. Another type of user input device is a cursor control 814, such as a mouse, a trackball, or cursor direction keys for communicating direct information and command selections to the processor 802 and for controlling cursor movement on the display 810. The cursor control 814 typically has two degrees of freedom in two axes, a first axis (e.g., x) and a second axis (e.g., y), that allow the device to specify positions in a plane.

The term "computer readable instructions" as used above refers to any instructions that may be performed by the processor 802 and/or other component of the computer system 800. Similarly, the term "computer readable medium" refers to any storage medium that may be used to store the computer readable instructions. Such a medium may take many forms, including, but not limited to, non-volatile media, volatile media, and transmission media. Non-volatile media include, for example, optical or magnetic disks, such as the storage device 808. Volatile media includes dynamic memory, such as the main memory 804. Transmission media includes coaxial cables, copper wire, and fiber optics, including wires of the bus 818. Transmission media can also take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 802 for execution. For example, the instructions may initially be borne on a magnetic disk of a remote computer. The remote computer can load the instructions into its dynamic memory and send the instructions over a telephone line using a modem. A modem local to the computer system 800 can receive the data on the telephone line and use an infrared transmitter to convert the data to an infrared signal. An infrared detector coupled to the bus 818 can receive the data carried in the infrared signal and place the data on the bus 818. The bus 818 carries the data to the main memory 804, from which the processor 802 retrieves and executes the instructions. The instructions received by the main memory 804 may optionally be stored on the storage device 808 either before or after execution by the processor 802.

The computer system 800 may also include a communication interface 816 coupled to the bus 818. The communication interface 816 provides a two-way data communication coupling between the computer system 800 and a network. For example, the communication interface 816 may be an integrated services digital network (ISDN) card or a modem used to provide a data communication connection to a corresponding type of telephone line. As another example, the communication interface 816 may be a local area network (LAN) card used to provide a data communication connection to a compatible LAN. Wireless links may also be implemented. In any such implementation, the communication interface 816 sends and receives electrical, electromagnetic, optical, or other signals that carry digital data streams representing various types of information. The storage device 808 can further include instructions for carrying out various processes for image processing as described herein when executed by the processor 802. The storage device 808 can further include a database for storing data relative to same.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   on a virtualization platform, creating a first runtime instance of a virtual appliance;
   wherein the virtual appliance comprises an image file that includes a pre-configured operating-system environment packaged with a solution stack of software components;
   wherein the solution stack of software components are selected software components of a reference architecture comprising a plurality of software components;
   responsive to satisfaction of at least one performance criterion, dynamically scaling-out the solution stack to one or more additional runtime instances of the virtual appliance such that, in total, more physical resources are provisioned to the solution stack; and
   wherein the dynamically scaling-out comprises distributing, based on scaling rules, a subset of the solution stack to each of the first runtime instance and the one or more additional runtime instances;
   wherein the scaling rules define a plurality of explosion levels;
   wherein, for each explosion level in the plurality of explosion levels, the scaling rules specify a total number of runtime instances, a particular subset of the solution stack that should be distributed to each runtime instance, and provisioning requirements for each runtime instance;
   wherein, for each runtime instance of the first runtime instance and the one or more additional runtime instances, the distributing comprises:
      activating software components of the solution stack distributed to the runtime instance; and
      deactivating software components of the solution stack not distributed to the runtime instance.

2. The method of claim 1, wherein the dynamically scaling-out comprises creating the one or more additional runtime instances based on the scaling rules.

3. The method of claim 2, wherein the dynamically scaling-out comprises provisioning physical resources to the one or more runtime instances based on the scaling rules.

4. The method of claim 2, wherein:
   wherein the plurality of explosion levels comprise discrete levels of progressively increasing throughput that are defined in terms of runtime instances; and
   the dynamically scaling-out comprises transitioning from one level of the plurality of explosion levels to a higher level of the plurality of explosion levels.

5. The method of claim 1, comprising dynamically scaling-in the solution stack to the first runtime instance.

6. The method of claim 1, wherein the reference architecture comprises a service-oriented architecture (SOA).

7. The method of claim 1, wherein the at least one performance criterion is selected from the group consisting of processor utilization and memory utilization.

8. The method of claim 1, comprising facilitating communication among the software components.

9. The method of claim 8, wherein the facilitating comprises utilizing distribution proxies associated with each of the software components.

10. An information handling system comprising:
    a computer system comprising physical resources; and
    a hypervisor resident on the computer system, wherein the hypervisor is operable to:
       create a first runtime instance of a virtual appliance;
       wherein the virtual appliance comprises an image file that includes a pre-configured operating-system environment packaged with a solution stack of software components;
       wherein the solution stack of software components are selected software components of a reference architecture comprising a plurality of software components;
       responsive to satisfaction of at least one performance criterion, dynamically scale-out the solution stack to one or more additional runtime instances of the virtual appliance such that, in total, more physical resources are provisioned to the solution stack;
       wherein the dynamic scale-out comprises distribution, based on scaling rules, of a subset of the solution stack to each of the first runtime instance and the one or more additional runtime instances;
       wherein the scaling rules define a plurality of explosion levels;
       wherein, for each explosion level in the plurality of explosion levels, the scaling rules specify a total number of runtime instances, a particular subset of the solution stack that should be distributed to each runtime instance, and provisioning requirements for each runtime instance;
  wherein, for each runtime instance of the first runtime instance and the one or more additional runtime instances, the distribution comprises:
    activation of software components of the solution stack distributed to the runtime instance; and
    deactivation of software components of the solution stack not distributed to the runtime instance.

11. The information handling system of claim 10, wherein the virtual appliance comprises a metadata store, the metadata store comprising the scaling rules.

12. The information handling system of claim 11, wherein the dynamic scale-out comprises creation of the one or more additional runtime instances based on the scaling rules.

13. The information handling system of claim 11, wherein the dynamic scale-out comprises provision of at least a portion of the physical resources to the one or more runtime instances based on the scaling rules.

14. The information handling system of claim 11, wherein:
  wherein the plurality of explosion levels comprise discrete levels of progressively increasing throughput that are defined in terms of a number of runtime instances; and
  the dynamic scale-out comprises a transition from one level of the plurality of explosion levels to a higher level of the plurality of explosion levels.

15. The information handling system of claim 10, wherein the virtual appliance comprises an instance map that maps each software component of the solution stack to a runtime instance selected from among the first runtime instance and the one or more additional runtime instances.

16. The information handling system of claim 10, wherein the hypervisor is operable to scale in the solution stack to the first runtime instance.

17. The information handling system of claim 10, wherein the reference architecture comprises a service-oriented architecture (SOA).

18. The information handling system of claim 10, wherein the at least one performance criterion is selected from the group consisting of processor utilization and memory utilization.

19. The information handling system of claim 10, wherein the hypervisor is operable to facilitate communication among the software components via utilization of proxies associated with each of the software components.

20. A computer-program product comprising a non-transitory computer-usable medium having computer-readable program code embodied therein, the computer-readable program code adapted to be executed to implement a method comprising:
  creating a first runtime instance of a virtual appliance;
  wherein the virtual appliance comprises an image file that includes a pre-configured operating-system environment packaged with a solution stack of software components;
  wherein the solution stack of software components are selected software components of a reference architecture comprising a plurality of software components;
  responsive to satisfaction of at least one performance criterion, dynamically scaling-out the solution stack to one or more additional runtime instances of the virtual appliance such that, in total, more physical resources are provisioned to the solution stack; and
  wherein the dynamically scaling-out comprises distributing, based on scaling rules, a subset of the solution stack to each of the first runtime instance and the one or more additional runtime instances;
  wherein the scaling rules define a plurality of explosion levels;
  wherein, for each explosion level in the plurality of explosion levels, the scaling rules specify a total number of runtime instances, a particular subset of the solution stack that should be distributed to each runtime instance, and provisioning requirements for each runtime instance;
  wherein, for each runtime instance of the first runtime instance and the one or more additional runtime instances, the distributing comprises:
    activating software components of the solution stack distributed to the runtime instance; and
    deactivating software components of the solution stack not distributed to the runtime instance.

* * * * *